(12) United States Patent
Ikuse et al.

(10) Patent No.: US 10,382,455 B2
(45) Date of Patent: Aug. 13, 2019

(54) IDENTIFYING APPARATUS, IDENTIFYING METHOD, AND IDENTIFYING PROGRAM

(71) Applicant: NIPPON TELEGRAPH AND TELEPHONE CORPORATION, Chiyoda-ku (JP)

(72) Inventors: Tomonori Ikuse, Musashino (JP); Kazufumi Aoki, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/120,668

(22) PCT Filed: Mar. 5, 2015

(86) PCT No.: PCT/JP2015/056536
§ 371 (c)(1),
(2) Date: Aug. 22, 2016

(87) PCT Pub. No.: WO2015/137235
PCT Pub. Date: Sep. 17, 2015

(65) Prior Publication Data
US 2017/0019418 A1    Jan. 19, 2017

(30) Foreign Application Priority Data
Mar. 13, 2014   (JP) .................... 2014-050135

(51) Int. Cl.
*H04L 29/06* (2006.01)
*G06F 21/56* (2013.01)
*G06F 21/55* (2013.01)

(52) U.S. Cl.
CPC ........ *H04L 63/1416* (2013.01); *G06F 21/554* (2013.01); *G06F 21/56* (2013.01);
(Continued)

(58) Field of Classification Search
CPC ............. H04L 63/1416; H04L 63/1408; G06F 21/554; G06F 21/56
See application file for complete search history.

(56) References Cited

U.S. PATENT DOCUMENTS 7,870,610 B1 * 1/2011 Mitchell ................. G06F 21/53
726/22
9,195,826 B1 * 11/2015 Fang ....................... G06F 21/56
(Continued)

FOREIGN PATENT DOCUMENTS

| CN | 103269341 A | 8/2013 |
|----|----|----|
| JP | 2013-232113 A | 11/2013 |
| WO | WO 2014/180134 A1 | 11/2014 |

OTHER PUBLICATIONS

Takeshi Yagi et al., "Investigation and Analysis of Malware on Websites," 2010, IEEE pp. 73-81. (Year: 2010).*
(Continued)

*Primary Examiner* — Luu T Pham
*Assistant Examiner* — Canh Le
(74) *Attorney, Agent, or Firm* — Oblon, McClelland, Maier & Neustadt, L.L.P.

(57) ABSTRACT

A command and control server identifying apparatus provides data received by malware upon execution of the malware with a tag that allows to uniquely identify communication destination information of a source of the data, and tracks propagation of the data provided with the tag. Then, the command and control server identifying apparatus obtains a tag of data referred to by a branch instruction executed by the malware among tracked data. Then, the command and control server identifying apparatus identifies communication destination information of a command and control server that issues a command to the malware, based on communication destination information of a source associated with the obtained tag.

8 Claims, 9 Drawing Sheets

(52) U.S. Cl.
CPC ...... *H04L 63/1408* (2013.01); *H04L 63/1425* (2013.01); *H04L 2463/146* (2013.01)

(56) References Cited

U.S. PATENT DOCUMENTS

2013/0227691 A1* 8/2013 Aziz ................... G06F 21/567
726/24
2015/0172303 A1* 6/2015 Humble ............. H04L 63/1408
726/23

OTHER PUBLICATIONS

Yuji Kugisaki et al., "Bot Detection based on Traffic Analysis," 2007, IEEE, pp. 303-308 (Year: 2007).*
International Search Report dated May 26, 2015 in PCT/JP2015/056536 filed Mar. 5, 2015 (with English Abstract).
Yuhei Kawakoya, et al., "Tracing Malicious Code with Taint Propagation", Transactions of Information Processing Society of Japan, vol. 54, No. 8, Aug. 15, 2013, pp. 2079-2089.
Peter Wurzinger, et al., "Automatically Generating Models for Botnet Detection", in Proceedings of the 14th European Conference on Research in Computer Security, 2009, pp. 232-249.
Gregoire Jacob, et al., "JACKSTRAWS: Picking Command and Control Connections from Bot Traffic", in Proceedings of the 20th USENIX Conference on Security, 2011, 16 pages.
Notice of Allowance dated Aug. 9, 2016 in Japanese Patent Application No. 2016-507487 with English translation.
Extended European Search Report dated Jul. 21, 2017 in Patent Application No. 15761649.1.
Elizabeth Stinson, et al. "Characterizing Bots' Remote Control Behavior", Detection of Intrusions and Malware, 2007, pp. 89-108.

* cited by examiner

| COMMUNICATION DESTINATION | TAG |
|---|---|
| 192.168.2.150 | 0x001 |
| 192.168.5.140 | 0x002 |
| 192.168.2.150,192.168.5.140 | 0x003 |
| ... | ... |

# IDENTIFYING APPARATUS, IDENTIFYING METHOD, AND IDENTIFYING PROGRAM

FIELD

The present invention relates to an identifying apparatus, an identifying method, and an identifying program.

BACKGROUND

In recent years, damage caused by cyber attacks such as information leakage and DDoS (Distributed Denial of Service) attacks has shown no sign of ending. Cyber attacks use malware and damage is caused by a terminal infected with the malware. Since financial losses have actually occurred, the necessity of anti-malware is increasing.

When anti-malware is performed, it is ideal to prevent a terminal from getting infected with malware. However, since malware infection techniques have steadily advanced and diversified, it is difficult to prevent in advance all malware infection. Hence, measures premised on malware infection are essential.

Malware having infected a terminal performs communication with malicious servers prepared by an attacker, and legitimate sites during the course of an attack. The malicious servers include a command and control server, a download site, and an information leakage destination. The command and control server determines operation of the malware by a command, and the download site distributes an additional module and a malware body. In addition, the information leakage destination plays a role in receiving leaked information.

If IP addresses, FQDNs, or URLs of such malicious servers can be listed in a blacklist in advance, then damage resulting from malware infection can be suppressed to minimum by measures such as finding/isolation of infected terminals or blocking of communication based on detection of communication with the malicious servers. Note, however, that there is a possibility that an information leakage destination and a download site may be specified by commands from the command and control server. In addition, in the case of malware such as a bot, a command from the command and control server causes a later attack. Therefore, it is important to list particularly the command and control server among the malicious servers in a blacklist.

A command and control server blacklist is generally created by malware analysis. By analyzing malware, communication destinations of the malware can be obtained. Note, however, that the communication destinations include legitimate sites as communication destinations of communication aiming at attacking or interfering with analysis. Erroneous listing of legitimate sites in the blacklist results in load upon operation of measurements. Hence, it is a problem to identify only command and control servers from among a plurality of communication destinations obtained by analysis.

Conventionally, a determination as to whether a communication destination is a command and control server is made based on the content of communication occurring upon dynamic analysis (see, for example, Non Patent Literature 1). However, with the advancement of application of obfuscation/encryption to the content of communication, it has become difficult to identify command and control servers only by the content of communication.

A command and control server is a communication destination that controls operation of malware, using communication data. Therefore, if an analysis as to whether received data has determined operation of the malware can be made, then even if the content of communication is obfuscated/encrypted, it can be determined that a source of the received data is a command and control server.

Hence, attention is being focused on command and control server detection based on analysis of a method of using received data within malware. There are roughly two methods of controlling malware by a command and control server. One method is that arguments of a system call or API are specified in addition to program code to be executed by malware, and the other method is that only program code to be executed is specified. For example, in Non Patent Literature 2, a command and control server is identified based on a data-passing relationship between system calls issued in relation to transmitted and received data, and a command and control server can be identified when arguments of a system call or API are specified.

CITATION LIST

Non Patent Literatures

Non Patent Literature 1: P. Wurzinger, L. Bilge, T. Holz, J. Goebel, C. Kruegel, and E. Kirda, "Automatically Generating Models for Botnet Detection" In Proceedings of the 14th European Conference on Research in Computer Security Non Patent Literature 2: G. Jacob, R. Hund, C. Kruegel, and T. Holz, "JACKSTRAWS: Picking Command and Control Connections from Bot Traffic" In Proceedings of the 20th USENIX Conference on Security

SUMMARY

Technical Problem

However, in the above-described conventional techniques, since today's malware obfuscates/encrypts the content of communication, it may be difficult to identify a command and control server only by the content of communication. Hence, there is proposed a method in which a method of using received data of malware is analyzed and a command and control server is identified based on a data-passing relationship between system calls issued in relation to the received data; however, there is a problem that a command just for switching a function to be executed by the malware may not be able to be detected. For example, in a control method where a command and control server specifies only program code to be executed, since received data influences only branch instructions and is not used as arguments of a system call or API, a command and control server's command just for switching a function to be executed by malware may not be able to be detected.

In view of this, the invention is made to solve the above-described conventional art problems, and an object of the invention is to identify a command and control server even when there is only a command for switching program code to be executed.

Solution to Problem

An identifying apparatus includes: a tracking unit that provides data with a tag and tracks propagation of the data provided with the tag, the data being received by malware upon execution of the malware, and the tag allowing to uniquely identify communication destination information of a source of the data; a monitoring unit that obtains a tag of data referred to by a branch instruction among data tracked by the tracking unit, the branch instruction being executed by the malware; and an identifying unit that identifies communication destination information of a command and control server, based on communication destination information of a source associated with the tag obtained by the monitoring unit, the command and control server issuing a command to the malware.

An identifying method performed by an identifying apparatus, the method includes: a tracking process of providing data with a tag and tracking propagation of the data provided with the tag, the data being received by malware upon execution of the malware, and the tag allowing to uniquely identify communication destination information of a source of the data; a monitoring process of obtaining a tag of data referred to by a branch instruction among data tracked in the tracking process, the branch instruction being executed by the malware; and an identifying process of identifying communication destination information of a command and control server, based on communication destination information of a source associated with the tag obtained in the monitoring process, the command and control server issuing a command to the malware.

A non-transitory computer-readable recording medium having stored an identifying program for causing a computer to perform a process comprising: a tracking step of providing data with a tag and tracking propagation of the data provided with the tag, the data being received by malware upon execution of the malware, and the tag allowing to uniquely identify communication destination information of a source of the data; a monitoring step of obtaining a tag of data referred to by a branch instruction among data tracked in the tracking step, the branch instruction being executed by the malware; and an identifying step of identifying communication destination information of a command and control server, based on communication destination information of a source associated with the tag obtained in the monitoring step, the command and control server issuing a command to the malware.

Advantageous Effects of Invention

An identifying apparatus, an identifying method, and an identifying program disclosed in the present application provide an effect of being able to identify a command and control server even when there is only a command for switching program code to be executed.

DESCRIPTION OF EMBODIMENTS

An embodiment of an identifying apparatus, an identifying method, and an identifying program according to the present application will be described in detail below based on the drawings. Note that the identifying apparatus, identifying method, and identifying program according to the present application are not to be limited by the embodiment.

[First Embodiment]

In the following embodiment, the configuration and flow of processes of a command and control server identifying apparatus according to a first embodiment will be described in turn, and then, effects provided by the first embodiment will be described last.

[Configuration of a Command and Control Server Identifying Apparatus]

Figure 1:
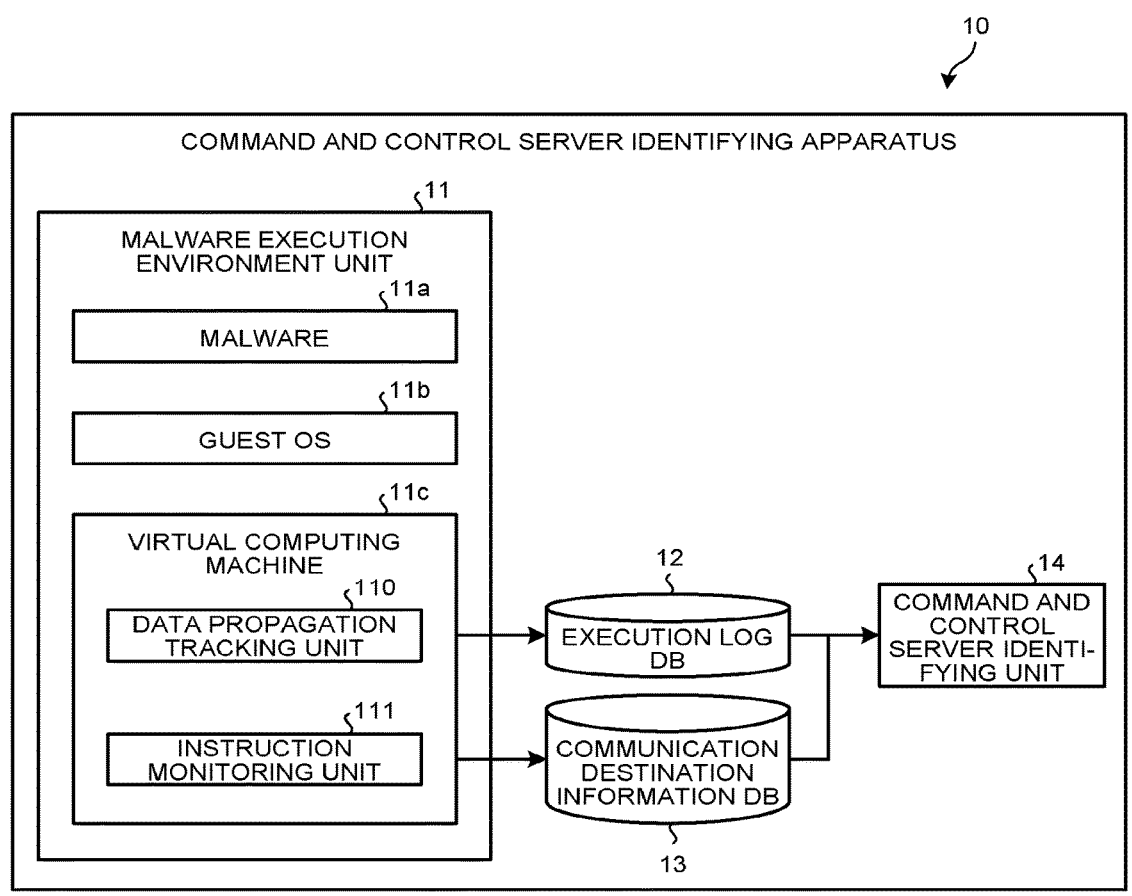
FIG. 1 is a configuration diagram illustrating an overview of a command and control server identifying apparatus according to a first embodiment.

First, a configuration of a command and control server identifying apparatus 10 will be described using FIG. 1. FIG. 1 is a configuration diagram illustrating an overview of a command and control server identifying apparatus according to the first embodiment. As illustrated in FIG. 1, the command and control server identifying apparatus 10 includes a malware execution environment unit 11, an execution log DB (Data Base) 12, a communication destination information DB 13, and a command and control server identifying unit 14. Processes performed by these units will be described below.

The malware execution environment unit 11 is composed of a guest OS (Operating System) 11b and a virtual computing machine 11c. The guest OS 11b is an environment for dynamically analyzing malware 11a. In addition, the malware 11a is a malicious program that causes a threat such as information leakage or unauthorized access, and is executed on the guest OS 11b as an analysis target program.

The virtual computing machine 11c is composed of a data propagation tracking unit 110 and an instruction monitoring unit 111. The data propagation tracking unit 110 provides data received by the malware 11a upon execution of the malware 11a with a tag that allows to uniquely identify communication destination information of a source of the data, and tracks propagation of the data provided with the tag. Specifically, the data propagation tracking unit 110 sets a tag that allows to uniquely identify a source, for data received by the malware 11a, and transfers the tag associated with communication destination information such as an IP address, an FQDN, or a URL to the communication destination information DB 13, and then tracks propagation of the data on the virtual computing machine 11c.

In addition, when new data is generated by receiving data from a plurality of sources, the data propagation tracking unit 110 creates a new tag that allows to uniquely identify communication destination information of the plurality of sources, and provides the data with the tag, and tracks propagation of the data provided with the tag. In addition, when received data is referred to in a function, the data propagation tracking unit 110 provides a return value of the function with a tag and tracks propagation of data provided with the tag.

The instruction monitoring unit 111 obtains a tag of data that is referred to by a branch instruction executed by the malware 11a among data tracked by the data propagation tracking unit 110. Specifically, the instruction monitoring unit 111 obtains a tag of data referred to by an API call or a system call issue, a branch instruction such as a jmp instruction or a call instruction, a call stack upon instruction execution, or a branch instruction, which is executed by the malware 11a, and transfers the tag to the execution log DB 12.

The execution log DB 12 stores a log obtained by the instruction monitoring unit 111. Specifically, the execution log DB 12 stores a tag of data referred to by an API call or a system call issue, a branch instruction such as a jmp instruction or a call instruction, a call stack upon instruction execution, or a branch instruction, which is executed by the malware 11a. In addition, the execution log DB 12 stores log information of an API call and a system call issue, a branch instruction, and a call stack, which are executed by the malware 11a.

Figures 3, 4:
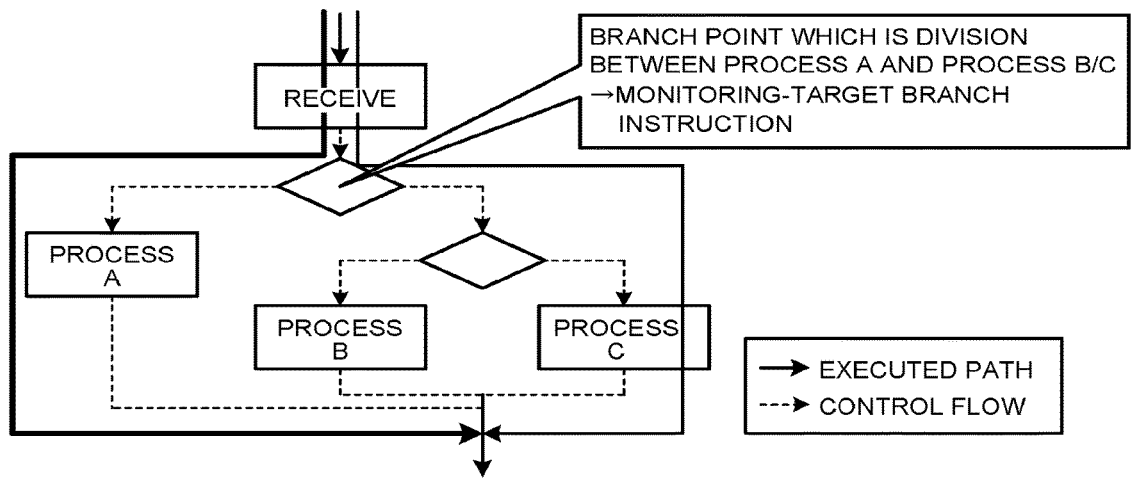
FIG. 3 is a diagram illustrating an example of a table stored in a communication destination information DB.
FIG. 4 is a diagram describing a monitoring-target branch instruction.

The communication destination information DB 13 stores the tags set by the data propagation tracking unit 110, in association with communication destination information such as IP addresses, FQDNs, or URLs. Now, using FIG. 3, an example of a method of associating a communication destination with a tag in the communication destination information DB 13 will be described. FIG. 3 is a diagram illustrating an example of a table stored in the communication destination information DB. As illustrated in FIG. 3, the communication destination information DB 13 stores a "communication destination" which is communication destination information of a source of data received by the malware 11a and a "tag" provided to the data received by the malware 11au such that the communication destination and the tag are associated with each other.

For example, as exemplified in FIG. 3, the tag associated with the IP address "192.168.2.150" is "0×001" and the tag associated with the IP address "192.168.5.140" is "0×002". Note that when computation of data provided with these tags is performed, a tag is newly created, and communication destinations associated with tags and involved in the creation are saved in the communication destination information DB 13. The example of FIG. 3 shows a result where by performing computation of data with the tag "0×001" associated with the IP address "192.168.2.150" and data with the tag "0×002" associated with the IP address "192.168.5.140", the tag "0×003" is newly created that indicates that influence from both the IP address "192.168.2.150" and the IP address "192.168.5.140" is received.

The command and control server identifying unit 14 identifies communication destination information of a command and control server that issues commands to the malware 11a, based on communication destination information of a source associated with the tag obtained by the instruction monitoring unit 111. Specifically, for a branch instruction where an API call or a system call issue has been performed at a plurality of branch destinations, when communication destination information associated with a tag of data that is referred to when the branch instruction is branched is common between the plurality of branch destinations, the command and control server identifying unit 14 identifies the communication destination information as communication destination information of the command and control server.

For example, the command and control server identifying unit 14 analyzes information on API calls and system call issues, branch instructions, and a call stack, which are executed by the malware 11a, the information being held in the execution log DB 12. By this, the command and control server identifying unit 14 extracts a branch instruction where an API call or a system call issue has been performed at a plurality of branch destinations, and obtains from the execution log DB 12 a tag of data that is referred to when the branch instruction is branched into the branch destinations where an API call or a system call issue has been performed.

Furthermore, the command and control server identifying unit 14 obtains communication destinations associated with tags from the communication destination information DB 13 and thereby obtains, for each branch destination, a communication destination having influenced a branch instruction, and determines a communication destination common between the branch destinations, as a command and control server.

Figure 2:
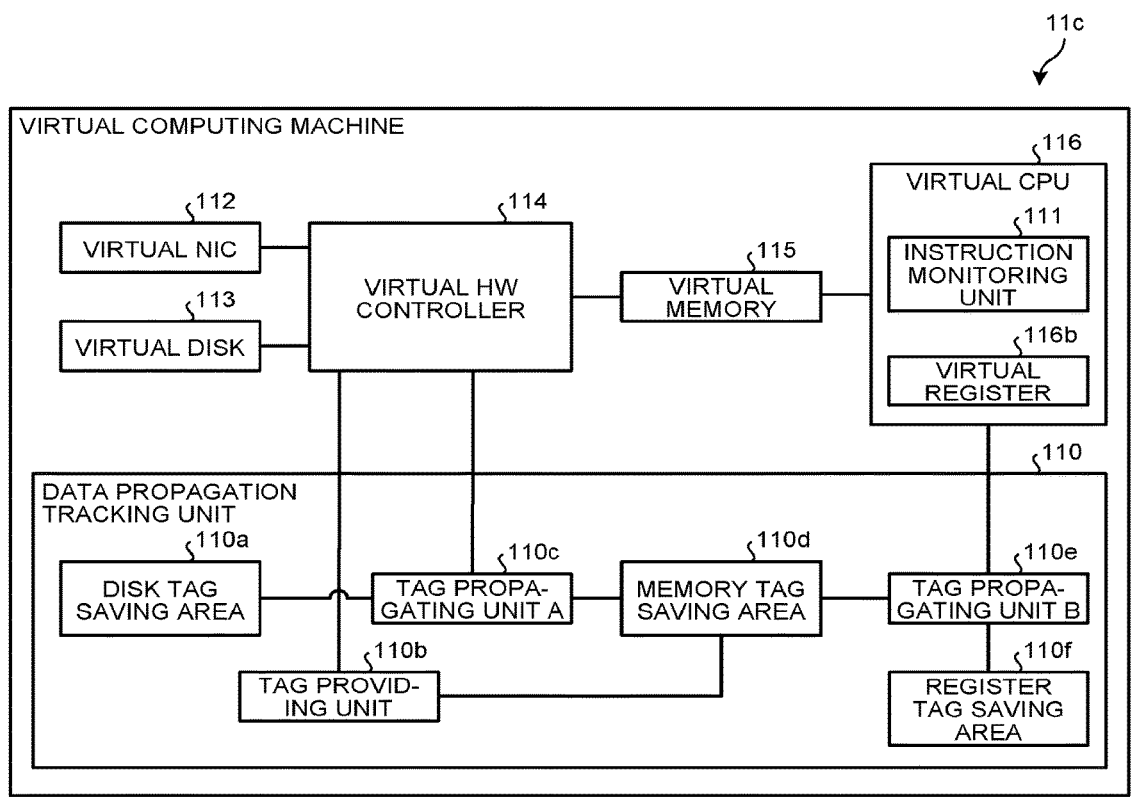
FIG. 2 is a block diagram illustrating configurations of a virtual computing machine and a data propagation tracking unit of the command and control server identifying apparatus according to the first embodiment.

Next, using FIG. 2, an exemplary configuration of the virtual computing machine 11c will be described. FIG. 2 is a block diagram illustrating configurations of the virtual computing machine and data propagation tracking unit of the command and control server identifying apparatus according to the first embodiment. The virtual computing machine 11c is software that provides virtual hardware to the guest OS 11b. In addition, the virtual computing machine 11c is composed of a virtual NIC 112, a virtual disk 113, a virtual HW controller 114, a virtual memory 115, a virtual CPU 116, etc.

In order for the data propagation tracking unit 110 to set a tag for data to track propagation of the data, the data propagation tracking unit 110 has a disk tag saving area 110a for saving tags associated with data on the virtual disk 113; a memory tag saving area 110d for saving tags associated with data on the virtual memory 115; and a register tag saving area 110f for saving tags associated with data on a virtual register 116b.

A tag providing unit 110b in the data propagation tracking unit 110 sets a tag that allows to uniquely identify a source, for received data and transfers the tag to the communication destination information DB 13, and then saves the tag in the memory tag saving area 110d. The timing at which the tag is set may be timing at which the data is copied from the virtual NIC 112 to the virtual memory 115, or the tag may be set when the malware 11a reads the received data by an API call or a system call issue. The tag set for the data is propagated by a tag propagating unit 110c (tag propagating unit A) in accordance with propagation of the data.

The tag propagating unit 110c performs propagation of a tag between the disk tag saving area 110a and the memory tag saving area 110d. In addition, a tag propagating unit 110e (tag propagating unit B) performs creation and propagation of a tag for when data is computed, and propagation of a tag for a return value of a function that has read a tag representing received data, in addition to propagation of a tag between the memory tag saving area 110d and the register tag saving area 110f and between the register tag saving area 110f and itself.

In addition, the instruction monitoring unit 111 monitors instructions executed by the malware 11a, and collects API calls and system call issues, branch instructions, tags referred to by branch instructions, and a call stack upon instruction execution, which are executed by the malware 11a. Upon monitoring instructions executed by the malware 11a, a method of identifying a process or thread of the malware 11a operating on the guest OS 11b may be a process ID or a thread ID, or the process or thread may be identified by setting a tag representing that it is an analysis target, for the analysis target malware 11a or for a program obtained from an external source.

Now, using FIG. 4, a monitoring-target branch instruction will be described. FIG. 4 is a diagram describing a monitoring-target branch instruction. The command and control server identifying apparatus 10 according to the first embodiment extracts a branch instruction which serves as a tag monitoring location from a log of executed instructions. For example, in the example of FIG. 4, the command and control server identifying apparatus 10 has a branch instruction which is a division between a process A and a process B/C, as a monitoring target.

That is, the command and control server identifying apparatus 10 refers to received data by a branch instruction which is a monitoring target, and analyzes a communication destination involved in determination of program code to be executed, and thereby identifies communication destination information of a command and control server. Here, in order to determine whether to get involved in determination of program code to be executed, there is a need to be able to grasp the fact that each path is executed by data received from the same communication destination.

Figure 5:
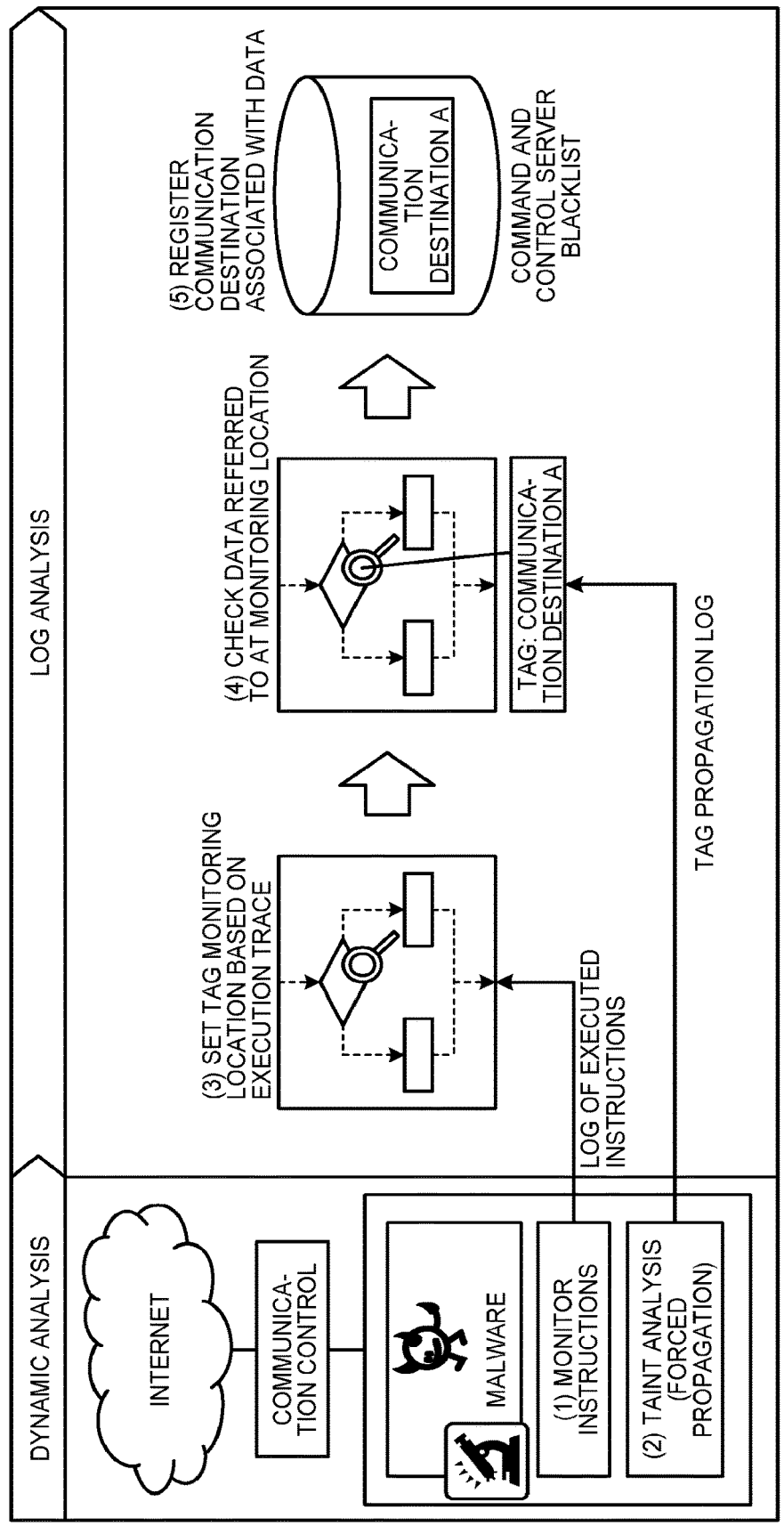
FIG. 5 is a diagram describing a process of identifying a command and control server by a branch instruction.

Next, using FIG. 5, an example of a process of identifying a command and control server by a branch instruction will be described. FIG. 5 is a diagram describing a process of identifying a command and control server by a branch instruction. As illustrated in FIG. 5, the command and control server identifying apparatus 10 obtains, as a log, API calls and system call issues, branch instructions, and a call stack upon instruction execution, which are executed when malware is executed (see (1) of FIG. 5). Then, the command and control server identifying apparatus 10 obtains a tag propagation log of received data by taint analysis (see (2) of FIG. 5).

Then, the command and control server identifying apparatus 10 sets a branch instruction as a tag monitoring location, based on an execution trace, and extracts the branch instruction serving as the tag monitoring location from the log of executed instructions (see (3) of FIG. 5). Here, it is assumed that branch destinations of the branch instruction serving as the monitoring location have a system call or an API call.

The command and control server identifying apparatus 10 checks data that is referred to at the monitoring location (see (4) of FIG. 5). Thereafter, the command and control server identifying apparatus 10 determines communication destination information associated with a tag that is added to the data, to be a command and control server and registers the communication destination information in a command and control server blacklist (see (5) of FIG. 5). As such, the command and control server identifying apparatus 10 identifies communication destination information associated with a tag of data that is referred to by a branch instruction serving as a monitoring location, as communication destination information of a command and control server. Thus, even when there is only a command for switching a function to be executed, the command and control server identifying apparatus 10 can identify a command and control server.

In addition, the command and control server blacklist is a list that lists known malicious IP addresses, URLs, etc. By registering communication destination information such as IP addresses of command and control servers in the blacklist, it is possible to block communication with the command and control servers or to find/isolate infected terminals.

As such, the command and control server identifying apparatus 10 provides received data obtained upon execution of malware with a tag and tracks the received data, monitors a branch instruction, and analyzes influence exerted on the branch instruction by the received data, and thereby identifies a command and control server. By this, even when malware receives only a command for switching a function to be executed, the command and control server identifying apparatus 10 can identify communication destination information of a command and control server.

[Processes Performed by the Command and Control Server Identifying Apparatus]

Figure 6:
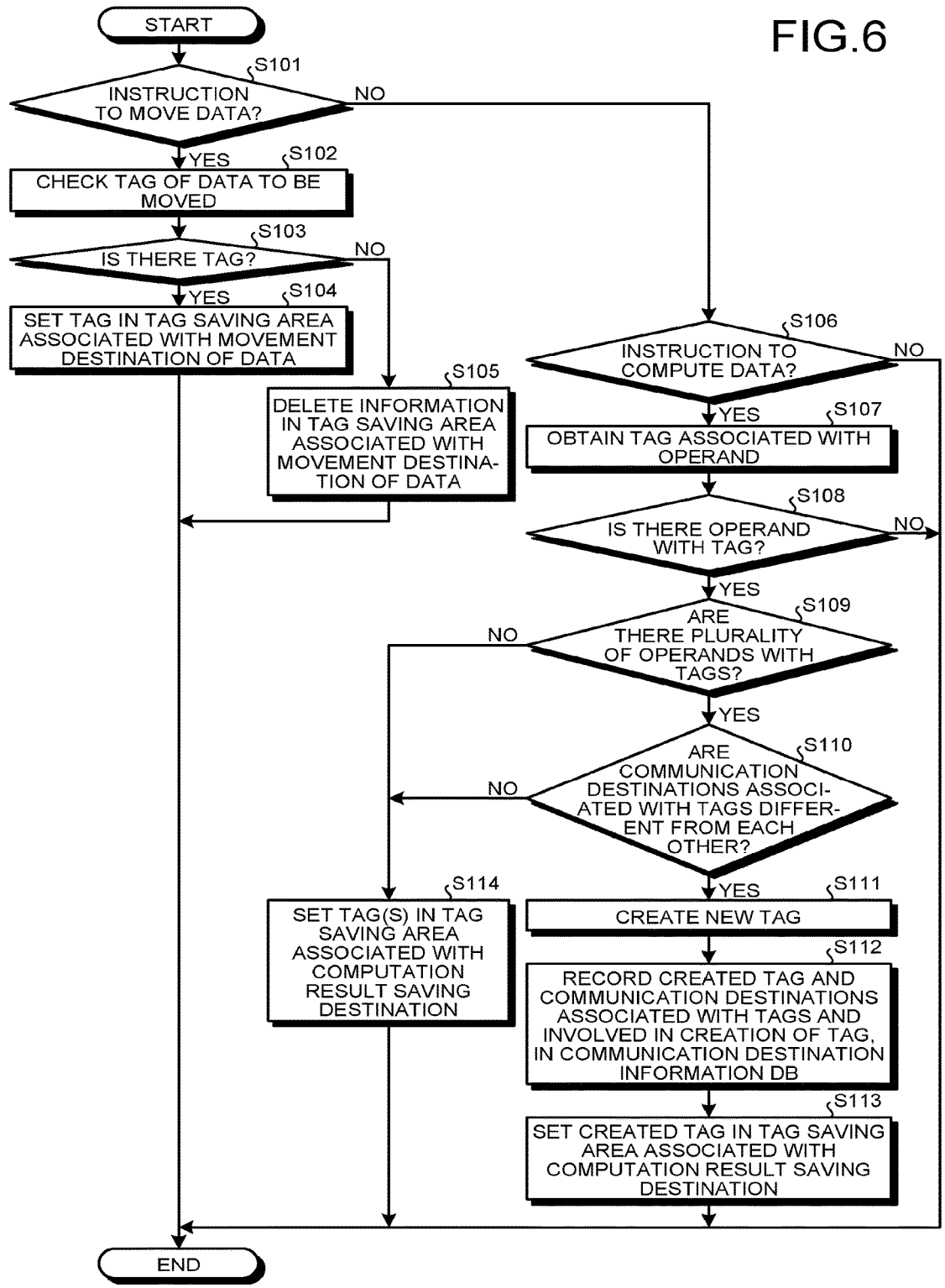
FIG. 6 is a flowchart illustrating the flow of a tag propagation process performed by the command and control server identifying apparatus according to the first embodiment.
Figure 7:
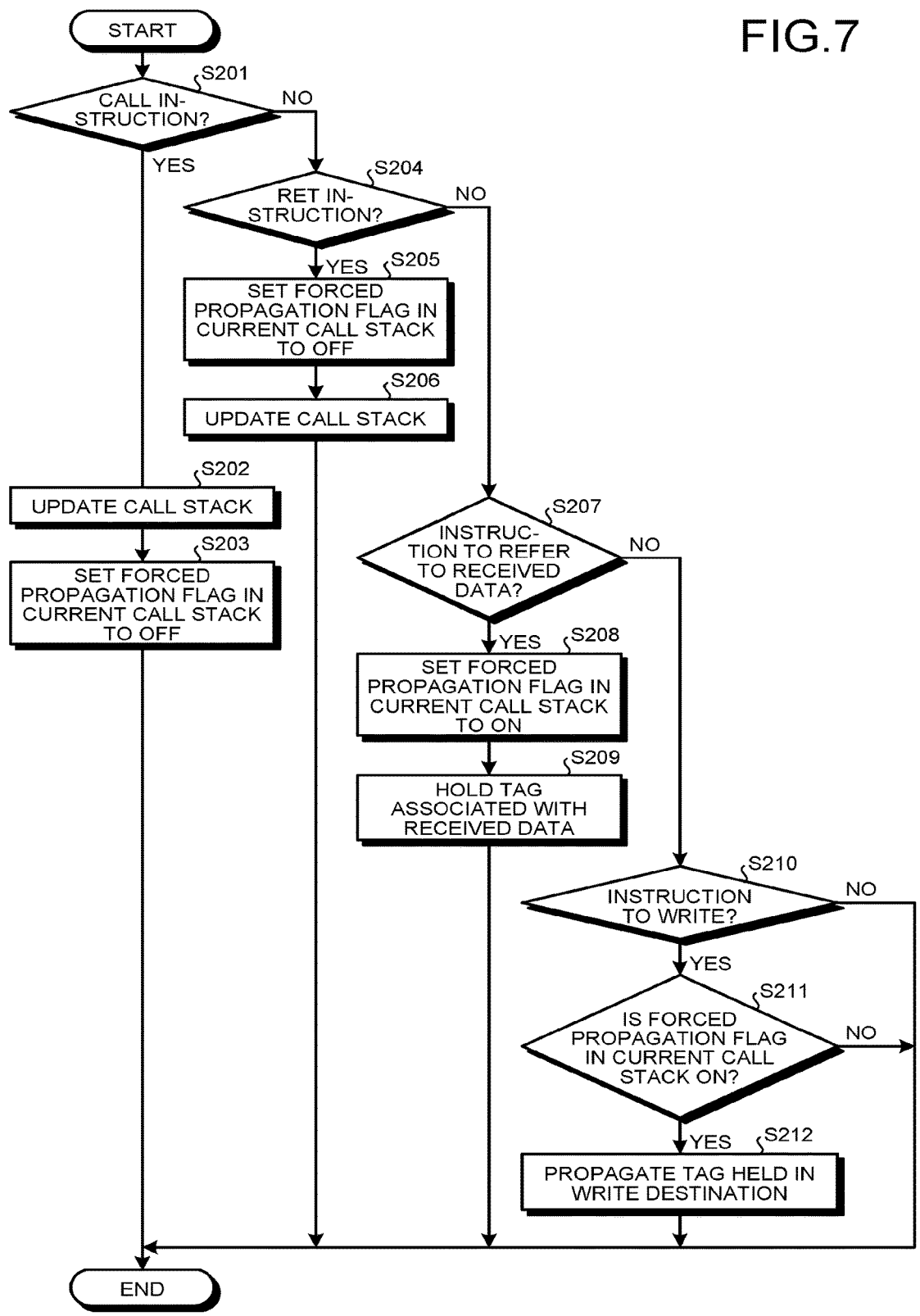
FIG. 7 is a flowchart illustrating the flow of a forced tag propagation process performed by the command and control server identifying apparatus according to the first embodiment.
Figure 8:
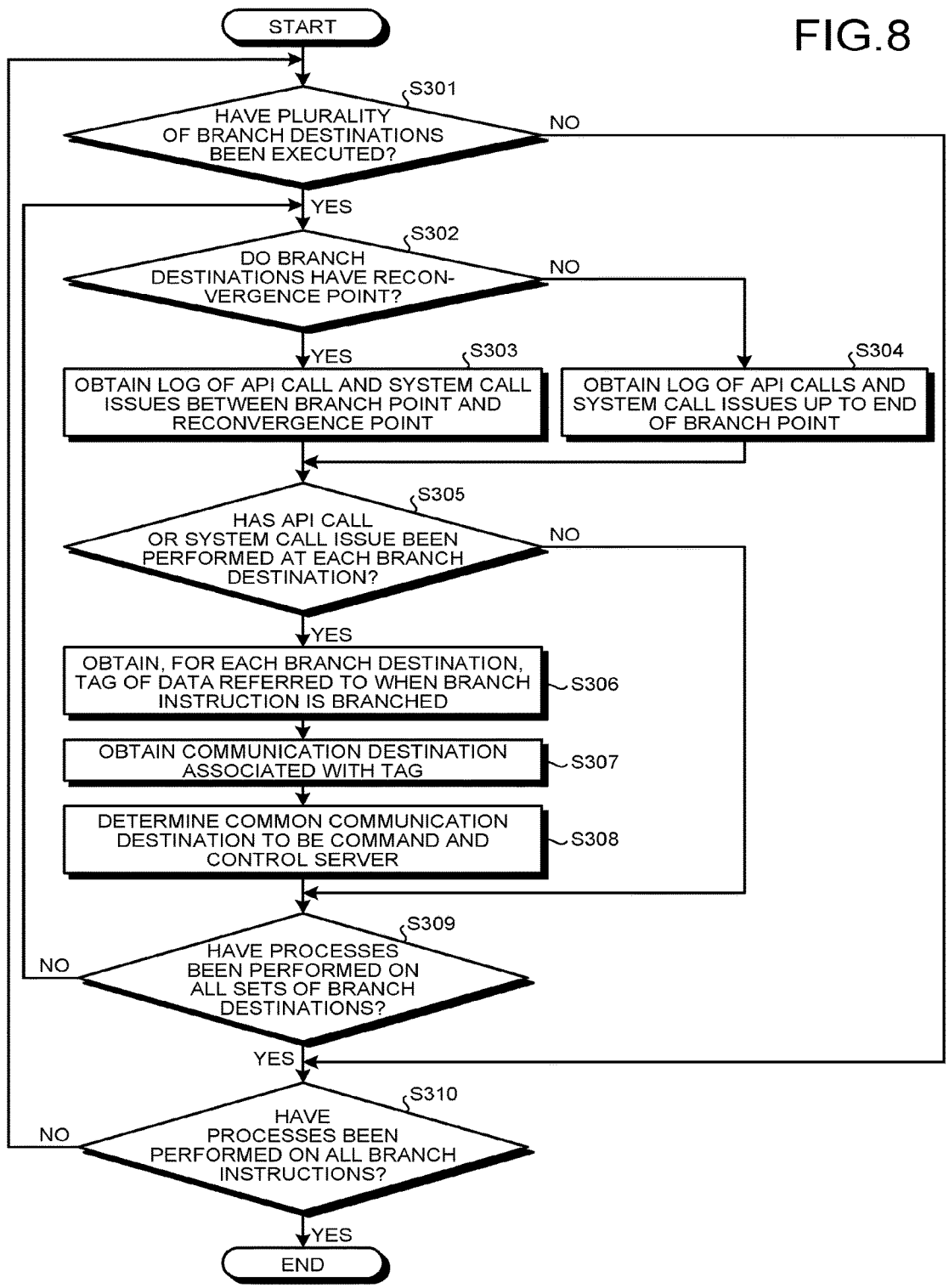
FIG. 8 is a flowchart illustrating the flow of a command and control server identifying process performed by the command and control server identifying apparatus according to the first embodiment.

Next, using FIGS. 6 to 8, processes performed by the command and control server identifying apparatus 10 according to the first embodiment will be described. FIG. 6 is a flowchart illustrating the flow of a tag propagation process performed by the command and control server identifying apparatus according to the first embodiment. FIG. 7 is a flowchart illustrating the flow of a forced tag propagation process performed by the command and control server identifying apparatus according to the first embodiment. FIG. 8 is a flowchart illustrating the flow of a command and control server identifying process performed by the command and control server identifying apparatus according to the first embodiment.

First, using FIG. 6, the flow of a tag propagation process performed by the tag propagating unit 110e of the command and control server identifying apparatus 10 according to the first embodiment will be described. In the process performed here, a propagation process is performed such that a determination as to whether to propagate a tag is made for each CPU instruction.

As illustrated in FIG. 6, the tag propagating unit 110e determines whether an instruction is an instruction to move data (step S101). If, as a result of the determination made by the tag propagating unit 110e, the instruction is an instruction to move data (positive at step S101), the tag propagating unit 110e checks a tag of the data to be moved (step S102). If there is a tag (positive at step S103), the tag propagating unit 110e sets the tag in a tag saving area associated with a movement destination of the data (step S104). In addition, if there is no tag for the data which is a movement source (negative at step S103), the tag propagating unit 110e deletes information in the tag saving area associated with the movement destination of the data (step S105).

On the other hand, if the instruction is not an instruction to move data (negative at step S101), the tag propagating unit 110e determines whether the instruction is an instruction to compute data (step S106). If, as a result of the determination, the instruction is an instruction to compute data (positive at step S106), the tag propagating unit 110e obtains a tag associated with an operand (step S107).

Then, the tag propagating unit 110e determines whether to newly create a tag, according to a result of the obtainment. Specifically, the tag propagating unit 110e determines whether there is an operand with a tag (step S108). If there is an operand with a tag (positive at step S108), the tag propagating unit 110e determines whether there are a plurality of operands with tags (step S109).

Then, if there are a plurality of operands with tags (positive at step S109), the tag propagating unit 110e determines whether communication destinations associated with the tags are different from each other (step S110). If, as a result of the determination, the communication destinations associated with the tags are different from each other (positive at step S110), the tag propagating unit 110e crates a new tag indicating that data is generated influenced by a plurality of communication destinations (step S111), and records the created tag and the communication destinations associated with the tags and involved in the creation of the tag, in the communication destination information DB 13 (step S112).

Thereafter, the tag propagating unit 110e sets the created tag in a tag saving area associated with a computation result saving destination (step S113). On the other hand, if there is only one operand with a tag (negative at step S109), or if, even though there are a plurality of operands with tags, communication destinations associated with the tags are the same (negative at step S110), the tag propagating unit 110e sets (propagates) the tag(s) in a tag saving area associated with a computation result saving destination, without newly creating a tag (step S114).

Next, using FIG. 7, the flow of a forced tag propagation process performed by the command and control server identifying apparatus according to the first embodiment will be described. In the process, a CPU instruction is monitored, and even when movement or computation of data is not performed, tag propagation is performed.

As illustrated in FIG. 7, the tag propagating unit 110e determines whether an executed instruction is a call instruction (step S201). If the executed instruction is a call instruction (positive at step S201), the tag propagating unit 110e updates a call stack to identify a function (step S202), and sets a forced propagation flag in the current call stack to OFF (step S203).

In addition, if the executed instruction is not a call instruction (negative at step S201), the tag propagating unit 110e determines whether the executed instruction is a ret instruction (step S204). Then, if the executed instruction is a ret instruction (positive at step S204), since it is the end of a function, the tag propagating unit 110e sets a forced propagation flag in the current call stack to OFF (step S205) and updates the call stack (step S206).

In addition, if the executed instruction is not a ret instruction (negative at step S204), the tag propagating unit 110e determines whether the executed instruction in a function is an instruction to refer to received data (step S207). If, as a result of the determination, the instruction is an instruction to refer to received data (positive at step S207), the tag propagating unit 110e sets a forced propagation flag in the current call stack to ON (step S208) and holds a tag representing a source of the received data having been referred to (step S209).

In addition, if the executed instruction is not an instruction to refer to received data (negative at step S207), the tag propagating unit 110e determines whether the executed instruction is an instruction to write (step S210). If, as a result of the determination, an instruction to write is executed (positive at step S210), the tag propagating unit 110e determines whether a forced propagation flag in the current call stack is ON (step S211). If, as a result of the determination, the forced propagation flag in the current call stack is in an ON state (positive at step S211), the tag propagating unit 110e propagates a tag held in a write destination (step S212).

Note that in addition to the above-described method, like the EAX register in the x86 architecture, a register used to store a return value in a specific architecture may be used as a return value and a tag indicating that influence from received data is received may be set when returning to a caller from a function, or for a known function, a specific register or memory address may be used as a return value in advance and a tag indicating that influence from received data is received may be set when returning to a caller from a function. By forcefully propagating a tag by such methods, even if a tag is not propagated due to substitution of data in a function, etc., the fact that influence from received data is received can be propagated.

Next, using FIG. 8, the flow of a command and control server identifying process performed by the command and control server identifying apparatus 10 according to the first embodiment will be described. In the process, the command and control server identifying unit 14 reads information held in the execution log DB 12 and information held in the communication destination information DB 13 and determines, as a command and control server, a source of data having influenced a branch instruction for switching an API call or a system call issue, which is executed by the malware 11a. The command and control server identifying unit 14 identifies all branch instructions recorded upon execution of the malware, taking also into account the circumstances of calls based on a call stack, and checks whether each branch instruction applies to the following conditions.

As illustrated in FIG. 8, first, the command and control server identifying unit 14 checks whether a plurality of branch destinations have been executed (step S301). Then, if the command and control server identifying unit 14 determines that a plurality of branch destinations have been executed (positive at step S301), the command and control server identifying unit 14 performs, for a branch instruction where the plurality of branch destinations have been executed, the following processes on all sets of the branch destinations, and thereby identifies a command and control server.

Specifically, the command and control server identifying unit 14 determines whether the branch destinations have a reconvergence point (step S302). If, as a result of the determination, the branch destinations have a reconvergence point (positive at step S302), the command and control server identifying unit 14 obtains a log of API calls and system call issues between a branch point and the reconvergence point (step S303). In addition, if the branch destinations do not have a reconvergence point (negative at step S302), the command and control server identifying unit 14 obtains a log of API calls and system call issues up to an end of the branch point (step S304). Note that API calls and system call issues to be checked may be limited according to computing resources operated by APIs and system calls, or may be limited by APIs and system calls that are called by malware and analyzed in advance.

Then, the command and control server identifying unit 14 determines whether an API call or a system call issue is performed at each branch destination (step S305). If, as a result of the determination, an API call or a system call issue is not performed at each branch destination (negative at step S305), the command and control server identifying unit 14 transitions to a process at step S309. In addition, if an API call or a system call issue has been performed at each branch destination (positive at step S305), the command and control server identifying unit 14 obtains a tag of data referred to when the branch instruction is branched from the execution log DB 12 (step S306), and obtains a communication destination associated with the tag from the communication destination information DB 13 (step S307), and thereby obtains, for each branch destination, a communication destination having influenced the branch instruction.

Then, a communication destination that is common between both branch destinations into which the branch instruction is branched is determined to be a command and control server (step S308). By this, the communication destination can be determined to be a command and control server on the ground that program code to be executed by the malware is determined by controlling the branch destinations.

Thereafter, the command and control server identifying unit 14 determines whether the processes at steps S302 to S308 have been performed on all sets of the branch destinations (step S309). If the processes have not been performed on all sets of the branch destinations (negative at step S309), the command and control server identifying unit 14 returns to step S302. In addition, if the processes have been performed on all sets of the branch destinations (positive at step S309), the command and control server identifying unit 14 determines whether the processes at steps S301 to S309 have been performed on all branch instructions (step S310). If, as a result of the determination, the processes have not been performed on all branch instructions (negative at step S310), the command and control server identifying unit 14 returns to step S301. In addition, if the processes have been performed on all branch instructions (positive at step S310), the command and control server identifying unit 14 ends the process there.

[Effects Provided by the First Embodiment]

As has been described above, the command and control server identifying apparatus 10 provides data received by the malware 11a upon execution of the malware 11a with a tag that allows to uniquely identify communication destination information of a source of the data, and tracks propagation of the data provided with the tag. Then, the command and control server identifying apparatus 10 obtains a tag of data that is referred to by a branch instruction executed by the malware 11a among tracked data. Then, the command and control server identifying apparatus 10 identifies communication destination information of a command and control server that issues commands to the malware 11a, based on communication destination information of a source associated with the obtained tag. As such, since the command and control server identifying apparatus 10 identifies a command and control server by a branch instruction, even when there is only a command for switching a function to be executed, a command and control server can be identified. The command and control server identifying apparatus 10 is suitable for identifying a command and control server when receiving a command for specifying only program code to be executed by malware, and can automatically identify a command and control server when the content of communication of malware is obfuscated/encrypted.

Figure 9:
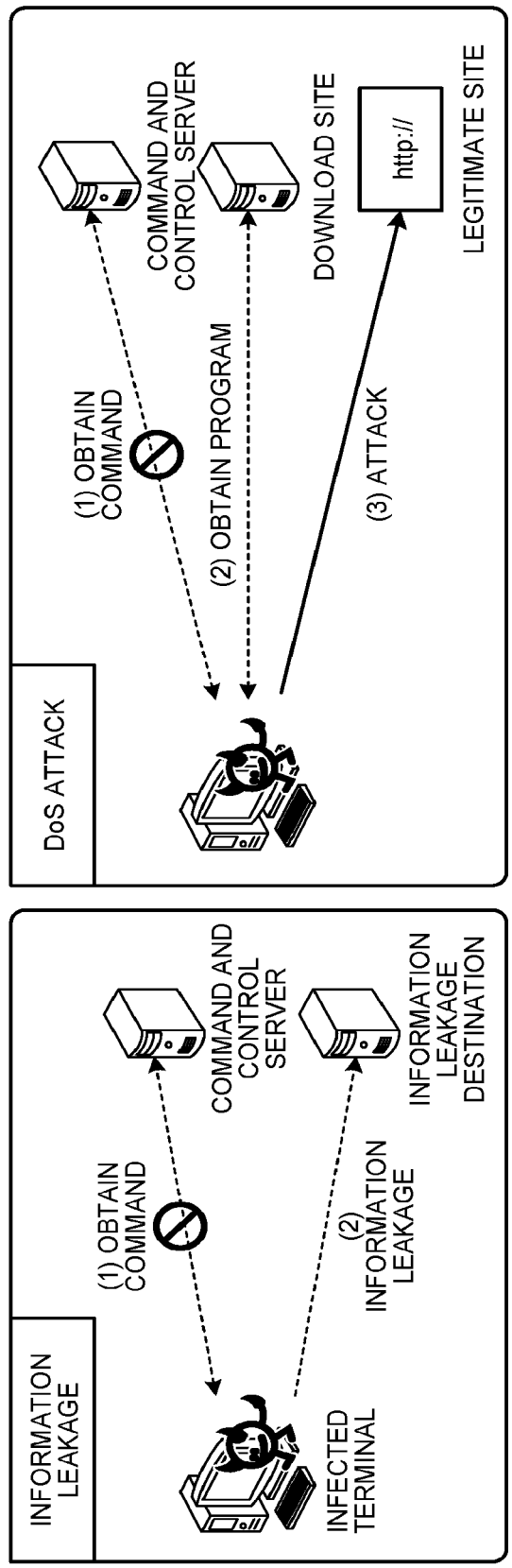
FIG. 9 is a diagram describing a process of performing anti-malware by detecting communication with a command and control server.

In addition, for example, the command and control server identifying apparatus 10 registers communication destination information such as IP addresses of command and control servers in a blacklist, and can thereby block communication with the command and control servers or find/isolate infected terminals. Specifically, as exemplified in FIG. 9, there are known cyber attacks where by a command and control server communicating with an infected terminal having been infected with malware, the infected terminal obtains a command issued by the command and control server and thereby leaks information to an information leakage destination, or the infected terminal obtains a program from a download site and thereby performs a DoS attack that attacks an legitimate site. For such cyber attacks, by using a blacklist where communication destination information such as IP addresses of command and control servers is registered, communication between infected terminals and the command and control servers is detected, enabling to block communication with the command and control servers or find/isolate the infected terminals. As a result, information leakage or DoS attacks can be prevented.

[System Configuration, Etc.]

In addition, the components of each apparatus illustrated are functionally conceptual and thus do not necessarily need to be physically configured as illustrated. Namely, a specific mode of distribution/integration of each apparatus is not limited to that illustrated, and all or part of each apparatus may be configured so as to be functionally or physically distributed/integrated in any unit, according to various loads, status of use, etc. Furthermore, all or any part of each processing function performed by each apparatus may be implemented by a CPU and a program that is analyzed and executed by the CPU, or may be implemented as wired logic hardware.

In addition, of the processes described in the present embodiment, all or part of a process that is described as being performed automatically may also be performed manually, or all or part of a process that is described as being performed manually may also be performed automatically by publicly known methods. In addition, information including processing procedures, control procedures, specific names, and various types of data and parameters illustrated in the above-described document or drawings may be arbitrarily changed unless otherwise stated.

[Program]

In addition, a program can also be created that describes processes performed by the command and control server identifying apparatus 10 which are described in the above-described embodiment, in a computer-executable language. For example, a specific program can also be created that describes processes performed by the command and control server identifying apparatus 10 according to the first embodiment, in a computer-executable language. In this case, by a computer executing the specific program, the same effects as those obtained by the above-described embodiment can be obtained. Furthermore, the same processes as those performed in the first embodiment may be implemented by recording the specific program in a computer-readable recording medium and causing a computer to read and execute the specific program recorded in the recording medium. An example of a computer that executes the specific program that implements the same functions as those of the command and control server identifying apparatus 10 illustrated in FIG. 1 will be described below.

Figure 10:
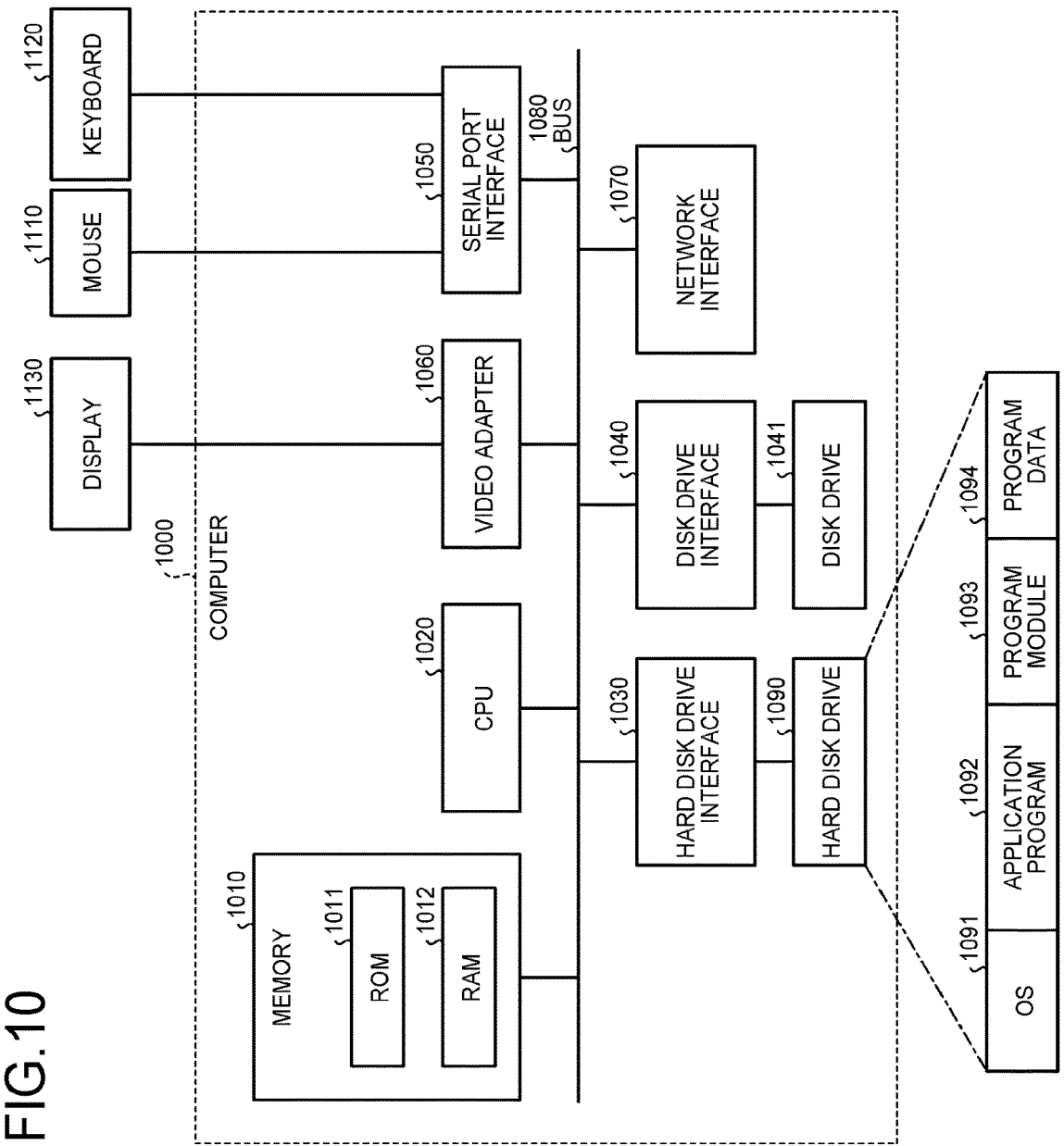
FIG. 10 is a diagram illustrating a computer that executes a specific program.

FIG. 10 is a diagram illustrating a computer 1000 that executes the specific program. As exemplified in FIG. 10, the computer 1000 includes, for example, a memory 1010, a CPU 1020, a hard disk drive interface 1030, a disk drive interface 1040, a serial port interface 1050, a video adapter 1060, and a network interface 1070, and these units are connected to each other by a bus 1080.

As exemplified in FIG. 10, the memory 1010 includes a ROM (Read Only Memory) 1011 and a RAM (Random Access Memory) 1012. The ROM 1011 stores, for example, a boot program such as BIOS (Basic Input Output System). As exemplified in FIG. 10, the hard disk drive interface 1030 is connected to a hard disk drive 1090. As exemplified in FIG. 10, the disk drive interface 1040 is connected to a disk drive 1041. For example, a removable storage medium such as a magnetic disk or an optical disk is inserted into the disk drive. As exemplified in FIG. 10, the serial port interface 1050 is connected to, for example, a mouse 1110 and a keyboard 1120. As exemplified in FIG. 10, the video adapter 1060 is connected to, for example, a display 1130.

Here, as exemplified in FIG. 10, the hard disk drive 1090 stores, for example, an OS 1091, an application program 1092, a program module 1093, and program data 1094. Namely, the above-described specific program is stored in, for example, the hard disk drive 1090, as a program module that describes commands to be executed by the computer 1000.

In addition, various types of data described in the above-described embodiment are stored in, for example, the memory 1010 or the hard disk drive 1090, as program data. Then, the CPU 1020 reads the program module 1093 and the program data 1094 which are stored in the memory 1010 or the hard disk drive 1090 into the RAM 1012 as necessary, and thereby performs an obtaining procedure, a comparison procedure, and a division control procedure.

Note that the program module 1093 and the program data 1094 which are related to the specific program are not limited to being stored on the hard disk drive 1090, and may be, for example, stored in a removable storage medium and read by the CPU 1020 through the disk drive, etc. Alternatively, the program module 1093 and the program data 1094 which are related to the specific program may be stored on another computer connected through a network (a LAN (Local Area Network), a WAN (Wide Area Network), etc.) and read by the CPU 1020 through the network interface 1070.

REFERENCE SIGNS LIST

10 COMMAND AND CONTROL SERVER IDENTIFYING APPARATUS
11 MALWARE EXECUTION ENVIRONMENT UNIT
11a MALWARE
11b GUEST OS
11c VIRTUAL COMPUTING MACHINE
110 DATA PROPAGATION TRACKING UNIT
110a DISK TAG SAVING AREA
110b TAG PROVIDING UNIT
110c TAG PROPAGATING UNIT A
110d MEMORY TAG SAVING AREA
110e TAG PROPAGATING UNIT B
110f REGISTER TAG SAVING AREA
111 INSTRUCTION MONITORING UNIT
112 VIRTUAL NIC
113 VIRTUAL DISK
114 VIRTUAL HW CONTROLLER
115 VIRTUAL MEMORY
116 VIRTUAL CPU
116b VIRTUAL REGISTER
12 EXECUTION LOG DB
13 COMMUNICATION DESTINATION INFORMATION DB
14 COMMAND AND CONTROL SERVER IDENTIFYING UNIT

The invention claimed is:

1. An identifying apparatus for identifying a command and control server transmitting a malicious program (malware) comprising:
    a memory;
    at least one central processing unit (CPU) connected to the memory and configured to
    tag, upon execution of malware, received malware data with source identification tag data, the source identification tag data allowing to uniquely identify communication destination information of a source of the malware data,
    track, on a virtual computing machine, propagation of the malware data associated with the source identification tag data,
    obtain, for each of plural branch destinations of a branch instruction, a tag of data referred to when the branch instruction is branched into the plural branch destinations, the branch instruction being executed by the malware and including any one of an application program interface (API) call, a system call, a jump (jmp) instruction, or a call instruction,
    identify communication destination information of a command and control server, by identifying communication destination information of a source associated with the obtained tags and common among the plural branch destinations, the command and control server issuing a command to the malware,
    block communication with the identified communication destination of the command and control server;
    create, in response to detecting that the communication destinations associated with the tags are different, a new tag, and record the created tag and communication destinations associated with tags in communication destination information database; and
    set created tag in a tag saving area associated with computation result saving destination,
    wherein the identifying apparatus is infected by the malware during the tracking operation.

2. The identifying apparatus according to claim 1, wherein when new data is generated by receiving malware data from a plurality of sources, the at least one CPU creates a new source identification tag and provides the new data with the new source identification tag, and tracks propagation of the new data provided with the new source identification tag, the new source identification tag allowing to uniquely identify communication destination information of the plurality of sources.

3. The identifying apparatus according to claim 1, wherein when received malware data is referred to in a function, the at least one CPU provides a return value of the function with a source identification tag and tracks propagation of the return value of the function provided with the source identification tag.

4. The identifying apparatus according to claim 1, wherein
    the at least one CPU obtains the source identification tag data of malware data referred to by the branch instruction and records an API call or a system call issue executed by the malware, and
    for the branch instruction where an API call or a system call issue has been performed at the plural branch destinations, when communication destination information associated with a source identification tag of malware data referred to when the branch instruction is branched is common between the plural branch destinations, the at least one CPU identifies the common communication destination information as communication destination information of the command and control server.

5. The identifying apparatus according to claim 3, wherein
    the at least one CPU obtains the source identification tag data of malware data referred to by the branch instruction and records an API call or a system call issue executed by the malware, and
    for the branch instruction where an API call or a system call issue has been performed at the plural branch destinations, when communication destination information associated with a source identification tag of malware data referred to when the branch instruction is branched is common between the plural branch destinations, the at least one CPU identifies the common communication destination information as communication destination information of the command and control server.

6. An identifying method for identifying a command and control server transmitting a malicious program (malware) performed by an identifying apparatus, the method comprising:

tagging, upon execution of malware, received malware data with a source identification tag, the source identification tag data allowing to uniquely identify communication destination information of a source of the malware data;

tracking, on a virtual computing machine, propagation of the malware data associated with the source identification tag data;

obtaining, for each of plural branch destinations of a branch instruction, a tag of data referred to when the branch instruction is branched into the plural branch destinations, the branch instruction being executed by the malware and including any one of an application program interface (API) call, a system call, a jump (jmp) instruction, or a call instruction;

identifying communication destination information of a command and control server, by identifying communication destination information of a source associated with the obtained tags and common among the plural branch destinations, the command and control server issuing a command to the malware;

blocking communication with the identified communication destination of the command and control server;

creating, in response to detecting that the communication destinations associated with the tags are different, a new tag, and record the created tag and communication destinations associated with tags in communication destination information database; and setting created tag in a tag saving area associated with computation result saving destination, wherein the identifying apparatus is infected by the malware during the tracking operation.

7. A non-transitory computer-readable recording medium having stored an identifying program for causing a computer to perform a method for identifying a command and control server transmitting a malicious program (malware), the method comprising:

tagging, upon execution of malware, received malware data with source identification tag data, the source identification tag data allowing to uniquely identify communication destination information of a source of the data;

tracking, on a virtual computing machine, propagation of the malware data associated with the source identification tag data;

obtaining, for each of plural branch destinations of a branch instruction, a tag of data referred to when the branch instruction is branched into the plural branch destinations, the branch instruction being executed by the malware and including any one of an application program interface (API) call, a system call, a jump (jmp) instruction, or a call instruction;

identifying communication destination information of a command and control server, by identifying communication destination information of a source associated with the obtained tags and common among the plural branch destinations, the command and control server issuing a command to the malware;

blocking communication with the identified communication destination of the command and control server;

creating, in response to detecting that the communication destinations associated with the tags are different, a new tag, and record the created tag and communication destinations associated with tags in communication destination information database; and setting created tag in a tag saving area associated with computation result saving destination, wherein the computer is infected by the malware during the tracking operation.

8. The identifying apparatus of claim 1, wherein the at least one CPU is further configured to detect an instruction to propagate malware data, and in response to the instruction being a yes, the at least one CPU is further configured to check the source identification tag data of the malware data to be propagated and set the source identification tag data in a tag saving area associated with movement destination of the data.

* * * * *